(12) United States Patent
Box

(10) Patent No.: US 11,606,451 B2
(45) Date of Patent: Mar. 14, 2023

(54) SMARTPHONE WITH INTEGRATED PAGER

(71) Applicant: Rockwell Collins, Inc., Cedar Rapids, IA (US)

(72) Inventor: Jeffrey L. Box, Farmersville, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 260 days.

(21) Appl. No.: 17/038,228

(22) Filed: Sep. 30, 2020

(65) Prior Publication Data

US 2022/0103666 A1    Mar. 31, 2022

(51) Int. Cl.
| | | |
|---|---|---|
| *H04B 1/3888* | (2015.01) |
| *H04W 4/00* | (2018.01) |
| *H04M 1/18* | (2006.01) |
| *H04M 1/02* | (2006.01) |
| *G06F 1/16* | (2006.01) |
| *G06F 1/28* | (2006.01) |
| *G08B 3/10* | (2006.01) |
| *G08B 5/22* | (2006.01) |
| *G08B 6/00* | (2006.01) |

(52) U.S. Cl.
CPC .......... *H04M 1/026* (2013.01); *G06F 1/1632* (2013.01); *G06F 1/28* (2013.01); *G08B 3/1058* (2013.01); *G08B 5/224* (2013.01); *G08B 6/00* (2013.01)

(58) Field of Classification Search
None
See application file for complete search history.

(56) References Cited

U.S. PATENT DOCUMENTS

| | | | |
|---|---|---|---|
| D374,980 S | 10/1996 | Moya et al. |
| 5,898,758 A | 4/1999 | Rosenberg |
| 6,934,560 B2 | 8/2005 | Chuang |
| 6,978,940 B2 * | 12/2005 | Luu | G06K 19/077 |
| | | | 235/485 |
| 6,981,085 B2 * | 12/2005 | Tree | A45C 11/38 |
| | | | 361/600 |
| 7,065,381 B2 | 6/2006 | Jenkins et al. |

(Continued)

FOREIGN PATENT DOCUMENTS

| | | |
|---|---|---|
| CN | 2534737 Y | 2/2003 |
| GB | 2324227 A | 10/1998 |

(Continued)

OTHER PUBLICATIONS

Extended Search Report in European Application No. 21200202.6 dated Feb. 17, 2022, 8 pages.

*Primary Examiner* — Tuan A Tran
(74) *Attorney, Agent, or Firm* — Suiter Swantz pc llo

(57) ABSTRACT

A smartphone case includes an integrated pager processor and pager antenna. The pager processor interfaces with the smartphone via physical connection such as USB or a wireless connection such as Bluetooth. A battery embedded in the smartphone case powers the pager processor and may be shared with the smartphone via a physical connection. The pager processor may display messages via the smartphone or independently via a speaker embedded in the smartphone case. The smartphone may communicate with a paging source via a cellular network to confirm receipt of one or both of a pager signal or a cellular network signal so that the paging source may produce maps of where various communication methods are useable.

14 Claims, 4 Drawing Sheets

(56) References Cited

U.S. PATENT DOCUMENTS

| | | | |
|---|---|---|---|
| 8,833,667 B2* | 9/2014 | Ahn ..................... | G06K 7/0008 |
| | | | 235/487 |
| 9,406,913 B2 | 8/2016 | Huang et al. | |
| 9,614,573 B2* | 4/2017 | Ames ..................... | H04B 1/006 |
| 9,723,122 B2* | 8/2017 | Ghaffari ............ | H04M 1/72412 |
| 10,090,875 B2* | 10/2018 | McCaughey .......... | H01Q 1/245 |
| 10,164,468 B2* | 12/2018 | Fitzgerald ............. | H02J 7/0042 |
| 2014/0073377 A1* | 3/2014 | Chang .................. | H04B 1/3888 |
| | | | 455/575.8 |
| 2015/0222756 A1 | 8/2015 | Tsaliah et al. | |
| 2016/0315652 A1* | 10/2016 | Tabatabai ................ | H04M 1/03 |
| 2018/0219986 A1* | 8/2018 | Lee ....................... | H02J 7/0044 |
| 2019/0230623 A1 | 7/2019 | Okajima et al. | |
| 2020/0220569 A1* | 7/2020 | In .......................... | H04B 1/3888 |

FOREIGN PATENT DOCUMENTS

| | | | |
|---|---|---|---|
| GB | 2421659 A | 6/2006 | |
| KR | 100249892 B1 | 3/2000 | |
| KR | 1020030017916 A | 3/2003 | |
| KR | 1020080034325 A | 4/2008 | |
| TW | 349719 U | 1/1999 | |

\* cited by examiner

SMARTPHONE WITH INTEGRATED PAGER

BACKGROUND

Emergency alerting systems uses pager technology with a hardened infrastructure that is generally more robust than cellular technology. However, pager technology is feature limited and most emergency alert system users (first responders and on-alert military personal) desire modern functionality without carrying additional devices. Those users already have cellular devices that are incompatible with pager infrastructure. It would be desirable to have a device for such users with modern cellular functionality and a reliable mechanism for accessing the hardened pager system when necessary.

SUMMARY

In one aspect, embodiments of the inventive concepts disclosed herein are directed to a smartphone case with an integrated pager processor and pager antenna. The pager processor interfaces with the smartphone via physical connection such as USB or a wireless connection such as Bluetooth. A battery embedded in the smartphone case powers the pager processor and may be shared with the smartphone via a physical connection. The pager processor may display data messages or play voice messages via an app running on the smartphone or independently via a speaker embedded in the smartphone case.

In a further aspect, the smartphone may communicate with a paging source via a cellular network to confirm receipt of one or both of a pager signal or a cellular network signal so that the paging source may produce maps of where various communication methods are useable. The phone may report back GPS position and signal strength on the pager channel.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
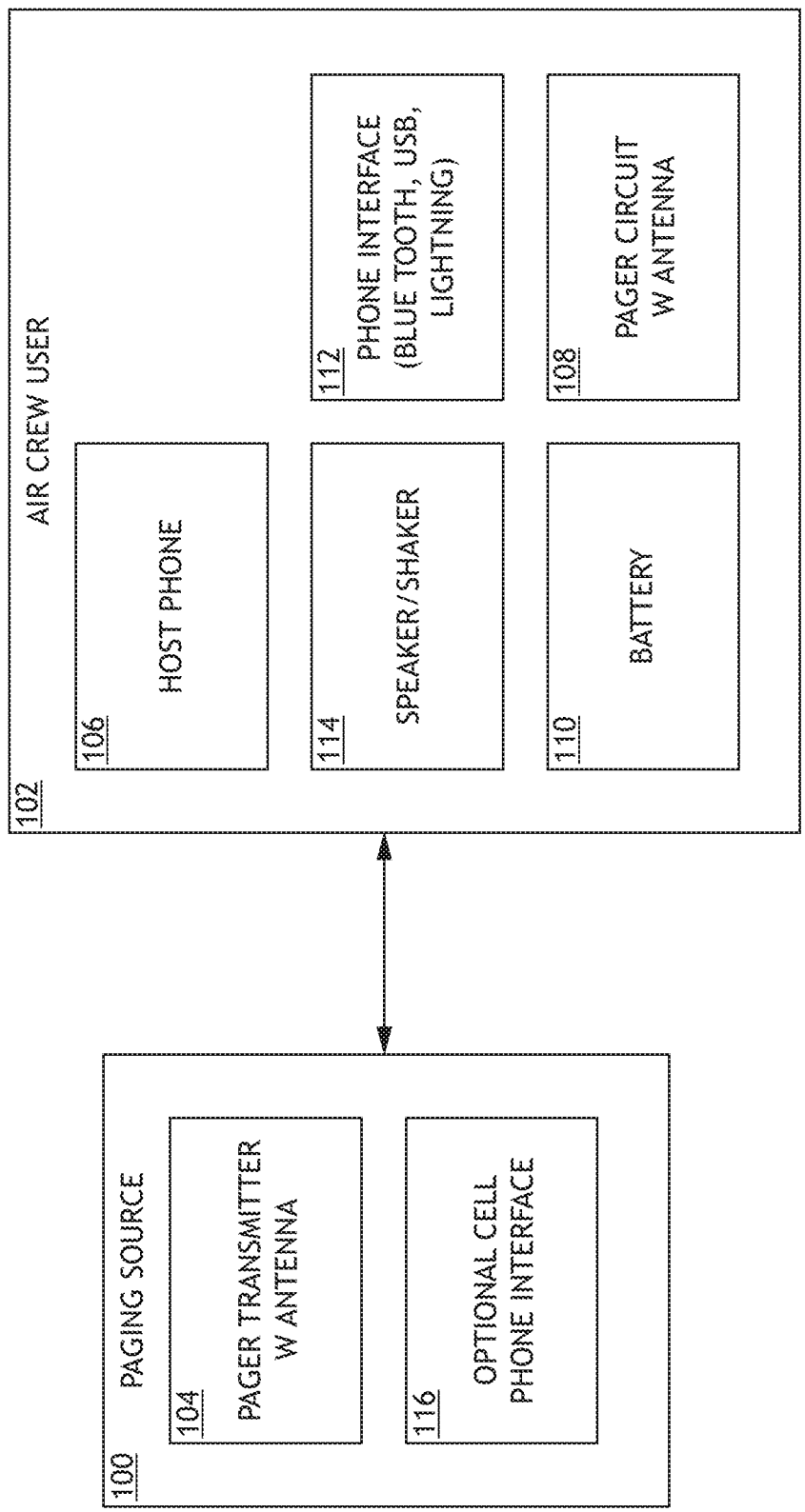
FIG. 1 shows a block diagram of a system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a smartphone case with an integrated pager processor and pager antenna. The pager processor interfaces with the smartphone via physical connection such as USB or a wireless connection such as Bluetooth. A battery embedded in the smartphone case powers the pager processor and may be shared with the smartphone via a physical connection. The pager processor may display messages via the smartphone or independently via a speaker embedded in the smartphone case.

Referring to FIG. 1, a block diagram of a system according to an exemplary embodiment is shown. Pager systems include a paging source 100 that utilizes a transmitter 104 and antenna. Paging sources 100 are generally local and self-contained; they may also be hardened against national or regional disruptions such as electro-magnetic pulses. Cellular networks are more nationally integrated and susceptible electro-magnetic disruptions. However, cellular networks and devices offer expanded data functionality and two-way communication where pager systems do not.

In at least one embodiment, a smartphone case 102, such as a silicone case, defines a cavity to contain a smartphone 106; pager circuitry 108 and a pager antenna are embedded in the body of the case where they would be disposed on a rear surface of the smartphone 106. A battery 110 is embedded in the body of the case and connected to the pager circuitry 108 and antenna. In at least one embodiment, the pager circuitry comprises a processor which may be configured for various data functions including communication with the smartphone 106 via a smartphone interface 112. In at least one embodiment, an application on the smartphone 106 may establish a datalink with the pager circuitry 108 via the smartphone interface 112 to access the functionality of the pager circuitry 108, including data access to the pager antenna and pager settings defined by the pager circuitry 108.

The smartphone interface 112 may comprise a physical interface such as USB or other proprietary interface technology. In at least one embodiment, the battery 110 may be connected to the smartphone interface 112 to provide supplementary power to the smartphone 106. In at least one embodiment, the smartphone interface 112 enables pass-through connectivity such that the smartphone interface 112 does not inhibit other connectivity to the smartphone 106 and allows the battery 110 to be charged via power to the smartphone interface 112. In at least one embodiment, a wireless charging element may be used to charge the battery 110 and the smartphone 106 via the smartphone interface 112.

In at least one embodiment, the pager circuitry 108 may utilize a speaker in the smartphone 106 via the smartphone interface. Alternatively, or in addition, a dedicated pager speaker 114 and/or haptic feedback/alert device may be embedded in the smartphone case to play audio tones or voice according to signals received by the pager circuitry 108 and pager antenna.

In at least one embodiment, the paging source 100 may comprise a cellular network interface 116 in addition to the pager transmitter 104 and antenna. In such embodiments, the paging source 100 may send both a pager signal and a cellular signal. The pager circuitry 108 would receive the pager signal and the smartphone 106 would receive the cellular signal, and the smartphone 106 would record both via communication with the pager circuitry 108 through the smartphone interface 112. Alternatively, the pager circuitry 108 may receive the pager signal while the smartphone does not receive the cellular signal, or does not receive not receive the cellular signal contemporaneously. In either circumstance, the smartphone 106 may tag the messages received with a timestamp and a location as defined by location services operating on the smartphone 106; the smartphone 106 may then send a confirmation to the paging source 100 indicating which signals were received along with the time and location. The paging source 100 may use a large dataset of such confirmations to interpolate a map of locations where services are available or not available. Critical responders can then be instructed to avoid unavailable areas when on duty.

The data and location information collected over the cellular network may be used to evaluate alerting system performance during test exercises and develop accurate confidence levels of performance during an actual emergency when only the pager channel may be operable.

In at least one embodiment, the pager circuitry 108 may include a data storage element for storing voice data. Alternatively, or in addition, the pager circuitry 108 may utilize data storage elements in the smartphone 106 via the smartphone interface 112.

Figure 2A:
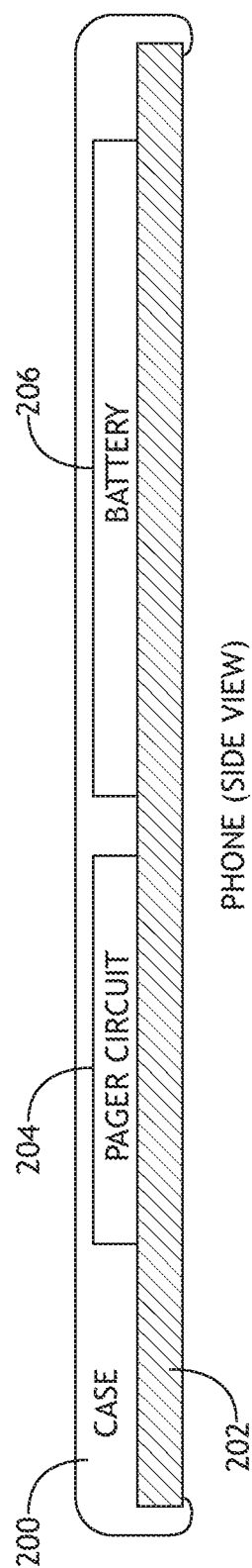
FIG. 2A shows a top view of a smartphone case according to an exemplary embodiment.
Figure 2B:
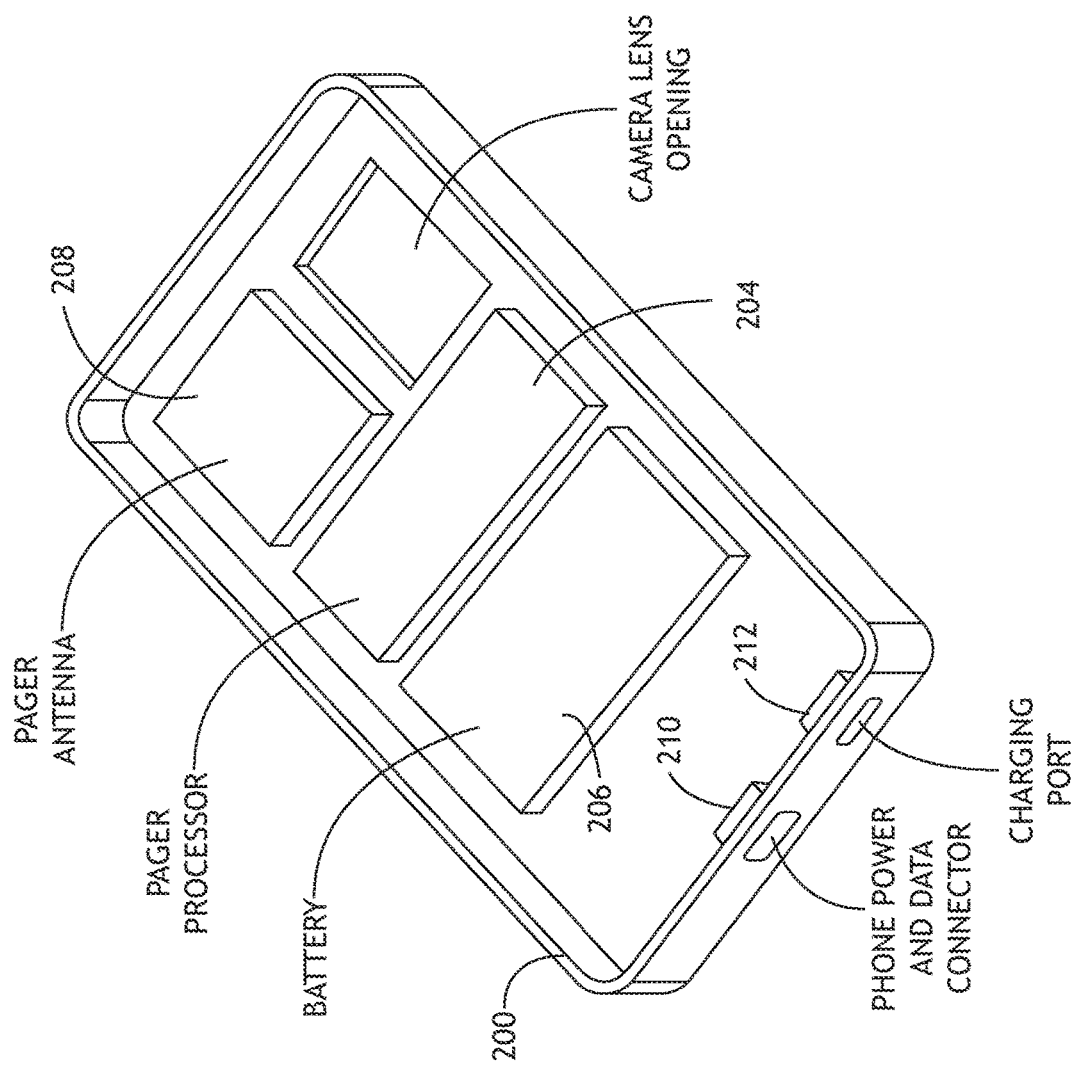
FIG. 2B shows a perspective view of a smartphone case according to an exemplary embodiment.
Figure 3:
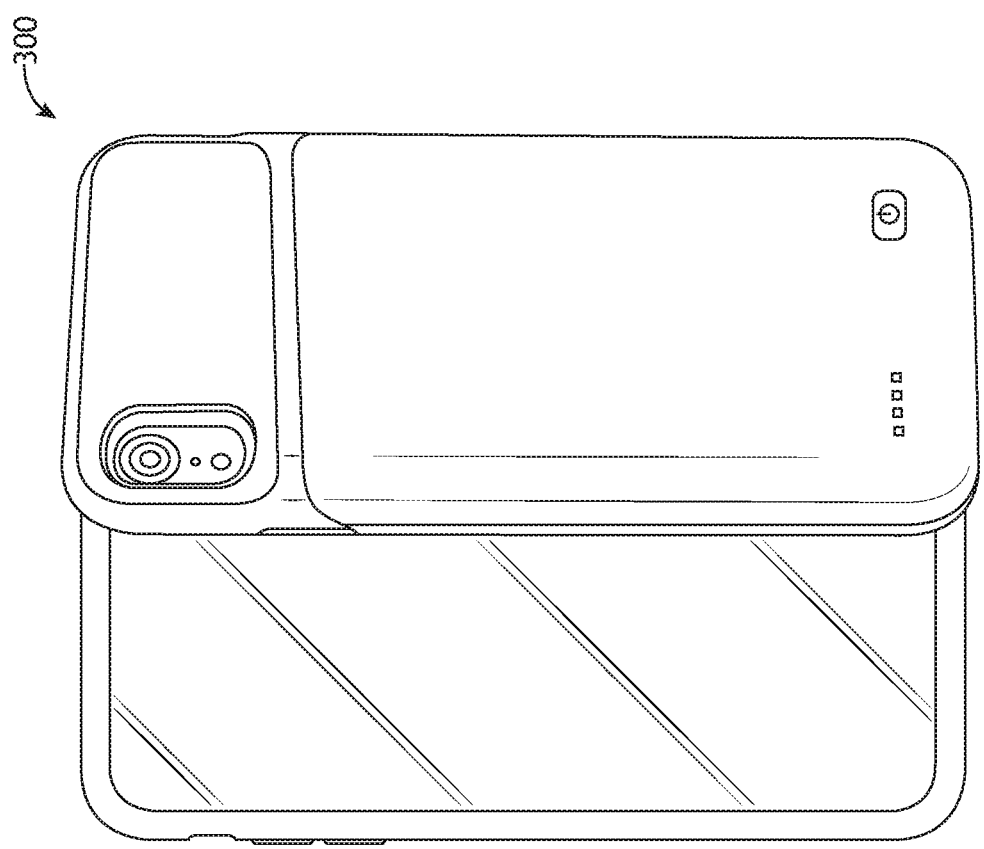
FIG. 3 shows an environmental view of a smartphone and case according to an exemplary embodiment.

Referring to FIGS. 2A-3, a top view and perspective view of a smartphone case 200, and an environmental view of a smartphone and case 300 according to an exemplary embodiment are shown. The smartphone case 200, 300 is configured to surround the edges of a smartphone 202 and contain pager circuitry 204 (including an antenna 208) and a battery 206 to service the pager circuitry 204. The pager circuitry 204 and battery 206 may be disposed so as to minimize the depth of the smartphone case 200, 300 and to balance the weight of the smartphone 202.

In at least one embodiment, the smartphone case 200 comprises a smartphone interface element 210 configured to allow data communication between the smartphone 202 and the pager circuitry 204, and to also allow power connectivity to the smartphone 202 for charging. Alternatively, or in addition, a charting port 212 may be disposed in the smartphone case 200 for separate charging of the battery 206.

Alternatively, in at least one embodiment, a non-case applique containing the pager circuitry 204 and a battery 206 may be removably affixed to a rear surface of a smartphone, such as via hook-and-loop fabric It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A smartphone case comprising:
   a case body configured to surround a smartphone and retain the case body on a rear surface of the smartphone;
   a battery embedded in the case body;
   a pager antenna embedded in the case body;
   a pager processing element embedded in the case body, the pager processing element connected to the battery and the pager antenna, and configured to interface with a pager network via the pager antenna; and
   a smartphone interface element connected to the pager processing element and configured to provide data and electrical connectivity to the smartphone,
   wherein:
      the pager processing element is further configured to receive periodic test messages from a paging source via the pager antenna and report back location and signal strength via the smartphone interface element and a cellular connection in response to the periodic test messages.

2. The smartphone case of claim 1, further comprising a speaker and haptic alert device embedded in the case body and connected to the pager processing element.

3. The smartphone case of claim 1, wherein the smartphone interface element is configured to provide power from the battery to the smartphone.

4. The smartphone case of claim 3, wherein the pager processing element is configured to continuously monitor a power level of the battery and prevent the smartphone from drawing power from the battery when the power level falls before a defined threshold.

5. The smartphone case of claim 1, wherein the pager processing element is configured to:
 receive a page; and
 communicate the page with the smartphone via the smartphone interface element.

6. The smartphone case of claim 1, wherein the smartphone interface element comprises a wireless datalink.

7. The smartphone case of claim 1, further comprising a wireless charging element embedded in the case body and connected to the battery.

8. The smartphone case of claim 7, wherein the wireless charging element is further configured to charge the smartphone via the smartphone interface element.

9. A system comprising:
 a paging source comprising:
  a pager transmitter; and
  a cellular network interface element; and
 a pager enabled smartphone comprising:
  a smartphone; and
  a smartphone case comprising:
   a case body surrounding the smartphone and retaining the case body on a rear surface of the smartphone;
   a battery embedded in the case body;
   a pager antenna embedded in the case body;
   a pager processing element embedded in the case body, the pager processing element connected to the battery and the pager antenna, and configured to interface with a pager network via the pager antenna; and
   a smartphone interface element connected to the pager processing element and configured to provide data and electrical connectivity to the smartphone,
   wherein:
    the pager source is configured to:
     transmit a pager signal via the pager transmitter; and
     transmit a cellular network signal via the cellular network interface element; and
    the pager enabled smartphone is configured to:
     determine if the pager enabled smartphone received the pager signal;
     determine if the pager enabled smartphone received the cellular network signal; and
     transmit a cellular return signal to the paging source indicating which of the pager signal and cellular network signal were received.

10. The system of claim 9, wherein
 the pager source is configured to:
  receive the cellular return signal;
  determine a location associated with the cellular return signal;
  record the cellular return signal and location to produce maps of locations accessible by pager signals and cellular network signals.

11. The system of claim 9, wherein:
 the pager processing element is configured to:
  receive a pager signal; and
  send the pager signal content to the smartphone via the smartphone interface element; and
 the smartphone is configured to display the pager signal content.

12. The system of claim 9, wherein the smartphone is configured to modify settings on the pager processor via the smartphone interface element based on user interaction.

13. The system of claim 9, wherein:
 the smartphone interface element is configured to provide power from the battery to the smartphone; and
 the pager processing element is further configured to:
  continuously monitor a power level of the battery; and
  prevent the smartphone from drawing power from the battery when the power level falls before a defined threshold.

14. The system of claim 9, wherein:
 the paging source is configured to send periodic test messages to the pager enabled smartphone; and
 the pager processor is further configured to report back location and signal strength via a cellular connection in response to the periodic test messages.

* * * * *